(12) United States Patent
Lee et al.

(10) Patent No.: US 11,058,958 B2
(45) Date of Patent: Jul. 13, 2021

(54) DEVICE FOR PLAYING GAME USING SEAT AND BALL IN AUTONOMOUS VEHICLE

(71) Applicants: HYUNDAI MOTOR COMPANY, Seoul (KR); KIA MOTORS CORPORATION, Seoul (KR)

(72) Inventors: Baek Hee Lee, Suwon-si (KR); Jong Hun Lee, Hwaseong-si (KR); Min Hyuk Kwak, Seoul (KR); Yo Seob Lee, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/694,350

(22) Filed: Nov. 25, 2019

(65) Prior Publication Data
US 2021/0016187 A1    Jan. 21, 2021

(30) Foreign Application Priority Data

Jul. 15, 2019   (KR) .......................... 10-2019-0085051

(51) Int. Cl.
*A63F 13/812*   (2014.01)
*A63F 13/213*   (2014.01)
(Continued)

(52) U.S. Cl.
CPC .......... *A63F 13/812* (2014.09); *A63F 13/213* (2014.09); *A63F 13/218* (2014.09);
(Continued)

(58) Field of Classification Search
USPC ...................................... 463/36, 29
See application file for complete search history.

(56) References Cited

U.S. PATENT DOCUMENTS

| 8,172,675 | B2 * | 5/2012 | Migos ..................... A63F 13/10 |
| | | | 463/29 |
| 2010/0248822 | A1 * | 9/2010 | Migos ..................... G06F 21/83 |
| | | | 463/29 |

(Continued)

FOREIGN PATENT DOCUMENTS

| CN | 107261491 A | 10/2017 |
| EP | 2508234 A1 | 10/2012 |

(Continued)

*Primary Examiner* — Pierre E Elisca
(74) *Attorney, Agent, or Firm* — Morgan, Lewis & Bockius LLP

(57) ABSTRACT

A gaming device in an autonomous vehicle includes: a body pressure sensor disposed in a seatback and a seat cushion at laterally symmetrical positions thereof and sensing a body pressure distribution of an upper body of a passenger and a body pressure distribution of a lower body of the passenger; a display device disposed at a position around a seat and displaying a game execution screen when the game using a ball is executed; a joystick disposed at a position around the seat and manipulating the game; and a game module connected to a front portion of the seat cushion and comprising: the ball enabling the passenger to kick the ball by a foot; a plurality of force sensors mounted on the ball; and a connector for holding the ball and outputting signals from the force sensors to a controller.

16 Claims, 12 Drawing Sheets

(51) Int. Cl.
*A63F 13/218* (2014.01)
*B60N 2/00* (2006.01)
*B60N 3/00* (2006.01)

(52) U.S. Cl.
CPC .............. *B60N 2/002* (2013.01); *B60N 3/00* (2013.01); *A63F 2300/8005* (2013.01); *A63F 2300/8011* (2013.01); *A63F 2300/8082* (2013.01)

(56) References Cited

U.S. PATENT DOCUMENTS

| | | | |
|---|---|---|---|
| 2010/0165090 | A1 | 10/2010 | Bisset et al. |
| 2013/0137524 | A1 | 5/2013 | Scott |
| 2018/0101225 | A1 | 4/2018 | Azmy |
| 2020/0406131 | A1* | 12/2020 | Benson .................. A63F 13/24 |

FOREIGN PATENT DOCUMENTS

| | | |
|---|---|---|
| KR | 10-1201655 B1 | 11/2012 |
| KR | 10-2015-0074873 A | 7/2015 |
| KR | 10-2018-0009409 A | 1/2018 |
| KR | 10-2019-0031699 A | 3/2019 |
| WO | 2018-040695 A1 | 8/2018 |

* cited by examiner

"Z" VIEW

FIG. 13

| Quality & Height of Free Kick | | | | | | | | | |
|---|---|---|---|---|---|---|---|---|---|
| Advance Quality of Ball | Out-Front | | | Knuckle | | | In-Front | | |
| Advance Height of Ball | Driven Kick (Left Upper) | Normal Kick (Left Middle) | Power Kick (Left Lower) | Driven Kick (Middle Upper) | Normal Kick (Middle) | Power Kick (Middle Lower) | Driven Kick (Right Upper) | Normal Kick (Right Middle) | Power Kick (Right Lower) |
| Kick Position | 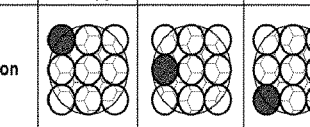 | 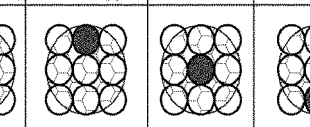 | 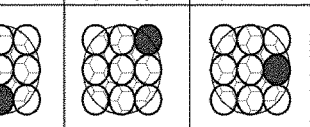 | 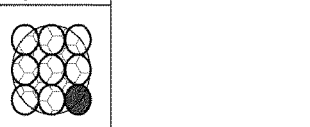 |  | 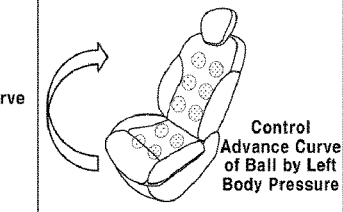 | 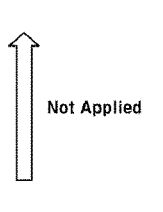 | 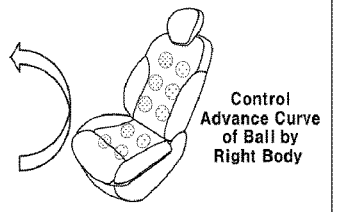 | |
| Advance Curve of Ball | Control Advance Curve of Ball by Left Body Pressure | | | Not Applied | | | Control Advance Curve of Ball by Right Body | | |
| Free Kick Intensity | | | | | | | | | |
| Kick Intensity | Weak | | | Normal | | | Strong | | |
| Kick Force | 5~15kgf | | | 15~25kgf | | | 25kgf↑ | | |

| Movement Method | | |
|---|---|---|
| Advance | Left Movement | Right Movement |
| Repeatedly Touch Ball at Intensity of 5 kgf or less | Left Turn Using Joystick (Armrest Position) | Right Turn Using Joystick (Armrest Position) |

FIG. 16

| Kicking Method | | | | | | | | | |
|---|---|---|---|---|---|---|---|---|---|
| Advance Quality of Ball | Out-Front | Out-Front | Out-Front | Knuckle | Knuckle | Knuckle | In-Front | In-Front | In-Front |
| Advance Height of Ball | Driven Kick (Left Upper) | Normal Kick (Left Middle) | Power Kick (Left Lower) | Driven Kick (Middle Upper) | Normal Kick (Middle) | Power Kick (Middle Lower) | Driven Kick (Right Upper) | Normal Kick (Right Middle) | Power Kick (Right Lower) |
| Kick Position | 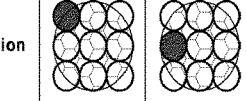 | 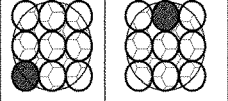 | 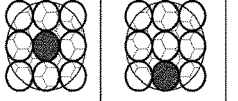 | 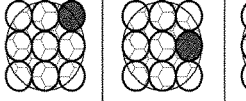 |  |  | | | |
| Pass/Shooting Intensity | | | | | | | | | |
| Level | Weak | | | Normal | | | Strong | | |
| Kick Intensity | 5~15kgf | | | 15~25kgf | | | 25kgf↑ | | |

FIG. 17

| | Heading | Physical Play | Tackle | Throwing |
|---|---|---|---|---|
| Body Pressure Sensor | Press the headrest body pressure sensors by the head at a ball contact timing | Press the seatback body pressure sensors upon executing a corner kick or a free kick | Press the seat cushion body pressure sensors after standing up | Press the seat cushion body pressure sensors after standing up |
| Camera | Move the head in a desired direction | Twist the body | Stretch one foot forwards | Stretch the arms forwards |

FIG. 18

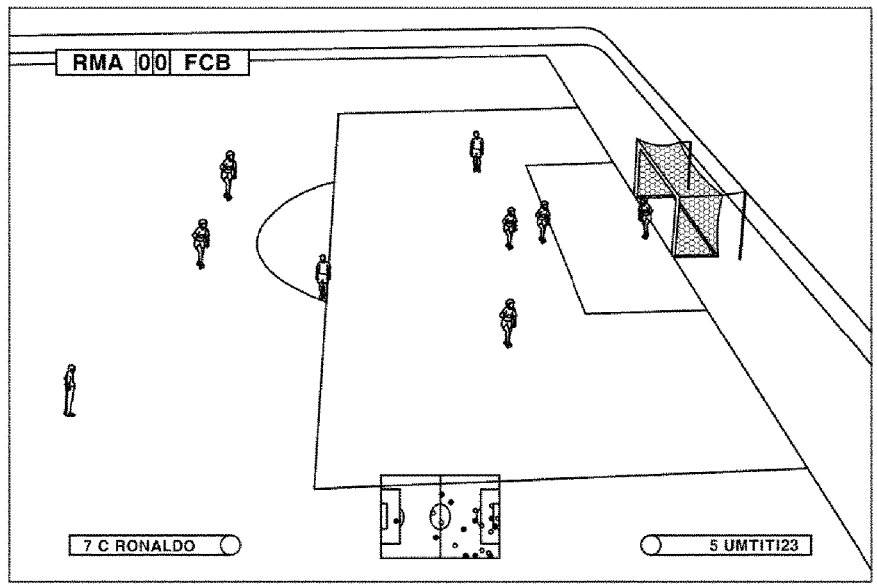

DEVICE FOR PLAYING GAME USING SEAT AND BALL IN AUTONOMOUS VEHICLE

CROSS-REFERENCE TO RELATED APPLICATION

This application claims priority to Korean Patent Application No. 10-2019-0085051 filed on Jul. 15, 2019, the entire contents of which are incorporated herein by reference.

TECHNICAL FIELD

The present disclosure relates to a device for playing a game using a seat and a ball in an autonomous vehicle, and more particularly, to a device for playing a game such as a football game using a game module or the like including a body pressure sensor and a ball mounted to a seat in an autonomous vehicle.

BACKGROUND

In the case of an autonomous vehicle configured to be driven without adjustment of a driver, passengers in the passenger room of the autonomous vehicle may take desired various postures in a state of being seated on seats, for a multilateral conference, a multilateral talk, viewing of an outside scene, reading, rest, sleeping, etc.

In connection with this, research and development have been conducted into seats for autonomous vehicles, to which various mechanisms such as a seat shift mechanism and a swivel mechanism are applied, in addition to basic mechanisms for position adjustment of seats in forward and rearward directions, adjustment of vertical heights of seats, tilting of seats, etc.

Although a seat mechanism exclusively used for autonomous vehicles in order to enable passengers to take various postures has been developed, the passengers may feel stuffy and tedious during long-distance travel.

For example, in the case of an autonomous vehicle, passengers spend time in a limited space during long-distance travel by using a smartphone or computer, viewing of an outside scene, reading, etc. while maintaining static postures. For this reason, the passengers may feel tedious due to limited movement of their bodies, and motion sickness may occur in a severe case.

Thus, it is necessary to apply a gaming device to the autonomous vehicle in order to provide a motion effect causing passengers to move their bodies during long-distance travel while providing amusement to the passengers while eliminating tediousness.

SUMMARY OF THE DISCLOSURE

The present disclosure has been made in an effort to solve the above-described problems associated with the prior art, and an object of the present disclosure is to provide a gaming device using a seat and a ball in an autonomous vehicle, which enables the passenger to play a game while viewing a game execution screen of a display in a state of being seated on a seat, and enables execution of a game using a ball, for example, a football game, based on a signal output from a body pressure sensor mounted to the seat to sense a body pressure distribution of the passenger and a signal generated upon sensing a force generated when the passenger kicks a ball of a game module, thereby being capable of providing a motion effect enabling the passenger to move the body during long-distance travel of the autonomous vehicle while providing amusement to the passenger while eliminating tediousness.

In one aspect, the present disclosure provides a device for playing a game using a seat and a ball in an autonomous vehicle, including: a body pressure sensor internally disposed in a seatback and a seat cushion at laterally symmetrical positions of the seatback and the seat cushion, the body pressure sensor configured to sense a body pressure distribution of an upper body of a passenger and a body pressure distribution of a lower body of the passenger; a display device disposed at a position around the seat, the display device configured to display a game execution screen when a game using the ball is executed; a joystick disposed at a position around the seat, the joystick configured to manipulate the ball in the game; a game module connected to a front portion of the seat cushion, the game module including the ball enabling the passenger to kick the ball by a foot, a plurality of force sensors mounted on the ball, and a connector for holding the ball and outputting signals from the force sensors to a controller, and the controller for outputting the game execution screen to the display device, and controlling overall execution of the game based on a sensing signal from the body pressure sensor and sensing signals from the force sensors.

The body pressure sensor may include a first body pressure sensor internally mounted in the seatback at the laterally symmetrical position of the seatback, to sense an upper body pressure of the passenger, and a second body pressure sensor internally mounted in the seat cushion at the laterally symmetrical position of the seat cushion, to sense a lower body pressure of the passenger.

The first body pressure sensor may include a 1-1-th left body pressure sensor for sensing a body pressure of a left upper back portion of the passenger, a 1-2-th left body pressure sensor for sensing a body pressure of a left middle back portion of the passenger, a 1-3-th left body pressure sensor for sensing a body pressure of a left waist portion of the passenger, a 1-1-th right body pressure sensor for sensing a body pressure of a right upper back portion of the passenger, a 1-2-th right body pressure sensor for sensing a body pressure of a right middle back portion of the passenger, and a 1-3-th right body pressure sensor for sensing a body pressure of a right waist portion of the passenger.

The second body pressure sensor may include a 2-1-th left body pressure sensor for sensing a body pressure of a left hip portion of the passenger, a 2-2-th left body pressure sensor for sensing a body pressure of a left thigh portion of the passenger, a 2-1-th right body pressure sensor for sensing a body pressure of a right hip portion of the passenger, and a 2-2-th right body pressure sensor for sensing a body pressure of a right thigh portion of the passenger.

The display device may include a multi-joint linkage connected to an armrest mounted to one side portion of the seat such that the multi-joint linkage is changeable in direction, and a display rotatably mounted to a free end of the multi-joint linkage.

The joystick may be mounted on an armrest mounted to one side portion of the seat such that the joystick can be manipulated by the passenger.

The display device may be connected to a connector exclusive for virtual reality (VR) provided at a predetermined position on the seatback such that the display device is used as a VR appliance for displaying a game screen in accordance with a command from the controller.

The force sensors of the game module may include 9 or more force sensors attached to one hemispherical surface of the ball between outer and lower layers of the ball while being uniformly spaced apart from one another in vertical and horizontal directions.

The connector of the game module may include an input connector mounted to the other hemispherical surface of the ball, and connected to the force sensors such that the input connector can exchange signals with the force sensors, an output connector connected to the controller such that the output connector can exchange signals with the controller, and a signal transfer connector for connecting the input connector and the output connector while having a multi-joint linkage structure with two or more links.

The controller may include a game input device for inputting information as to whether or not a game is executed and information as to selection of a game mode, a game execution controller for executing the game mode input through the game input device, and applying an activation signal to the force sensors of the body pressure sensor and the game module, a game operation calculator for receiving sensing signals from the body pressure sensor and the force sensors, calculating a current game execution motion of the passenger based on the received sensing signals, and inputting calculated results to the game execution controller, and a game output device for outputting a game execution screen and a sound in accordance with a command from the game execution controller.

The game mode selectable through the game input device may be a selected one of a penalty kick mode, a free kick mode and a match mode in a football game, or may be a selected one of a foot volleyball mode, a food baseball mode and a sepak takraw mode in a kicking game using feet.

In a penalty kick mode, the game operation calculator may determine a position where a ball shot by a kicker reaches and a position where a goal keeper blocks a shot ball from a plurality of divisional goal post areas, based on a body pressure signal from the body pressure sensor, and may determine a ball advance direction based on sensing signals generated from the force sensors when the passenger kicks the ball.

In a free kick mode, the game operation calculator may determine a free kick direction in accordance with a manipulation signal from the joystick, may determine an advance quality based on sensing signals of the force sensors varying in accordance with a kicking position of the passenger on the ball, may determine an intensity of a free kick based on sensing signals from the force sensors varying in accordance with a kicking intensity of the passenger kicking the ball, and may determine an advance curve of the ball generated during advance of the ball, based on a body pressure signal from the body pressure sensor.

In a match mode, the game operation calculator may determine a left/right dribble direction of the ball in accordance with a manipulation signal from the joystick, may determine an advancing dribble direction of the ball based on sensing signals from the force sensors generated when the passenger repeatedly touches the ball at a predetermined intensity or less, may determine an advance quality of the ball based on sensing signals from the force sensors varying in accordance with a kicking position of the passenger on the ball, may determine pass and shooting intensities based on sensing signals from the force sensors varying in accordance with a kicking intensity of the passenger, and may determine a ball dribble posture based on a body pressure signal from the body pressure sensor.

The controller may include a seat posture controller for outputting an adjustment signal for adjustment of a seat posture to meet a game mode input through the game input device, a virtual reality (VR) driving device for driving VR upon connection to a VR connector, and a pump driving device for supplying a driving command to a pump adapted to supply air to the ball of the game module or to deflate the ball.

The device may further include a camera for sensing motion of the passenger to determine various dribble postures upon playing a football game, and sending sensed results to the controller.

Other aspects and preferred embodiments of the disclosure are discussed infra.

The present disclosure may provide the following effects in accordance with the illustrated embodiments, the above-described configurations, the combinations of the configurations, and use relations thereof.

That is, it may be possible to provide a motion effect enabling the passenger to move the body while providing an amusement effect to the passenger while eliminating tediousness in a situation such as long-distance travel of an autonomous vehicle, which will be commercially available in future, by enabling the passenger to play a football game (in a penalty kick mode, a free kick mode, a match mode, or the like) in a state of being seated on a seat, based on a body pressure signal from a body pressure sensor generated when the upper and lower body portions, etc. of the passenger move and sensing signals generated from body pressure sensors when the passenger touches or kicks a ball.

It may also possible to play a kicking game using feet other than a football game through a foot volleyball mode, a food baseball mode, a sepak takraw mode, etc., using a body pressure signal from the body pressure sensor and sensing signals from the body pressure sensors.

It is understood that the terms "vehicle", "vehicular" and other similar terms as used herein are inclusive of motor vehicles in general such as passenger automobiles including sport utility vehicles (SUVs), buses, trucks, various commercial vehicles, watercraft including a variety of boats and ships, aircraft, and the like, and includes hybrid electric vehicles, electric vehicles, plug-in hybrid electric vehicles, hydrogen-powered vehicles and other alternative fuel (e.g. fuels derived from resources other than petroleum) vehicles. As referred to herein, a hybrid electric vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIGS. 13 and 14 are diagrams illustrating an example in which the passenger plays a football game in a free kick mode using the gaming device of the autonomous vehicle according to the present disclosure;

FIGS. 15 to 18 are diagrams illustrating an example in which the passenger plays a football game in a match mode using the gaming device of the autonomous vehicle according to the present disclosure.

Figure 1:
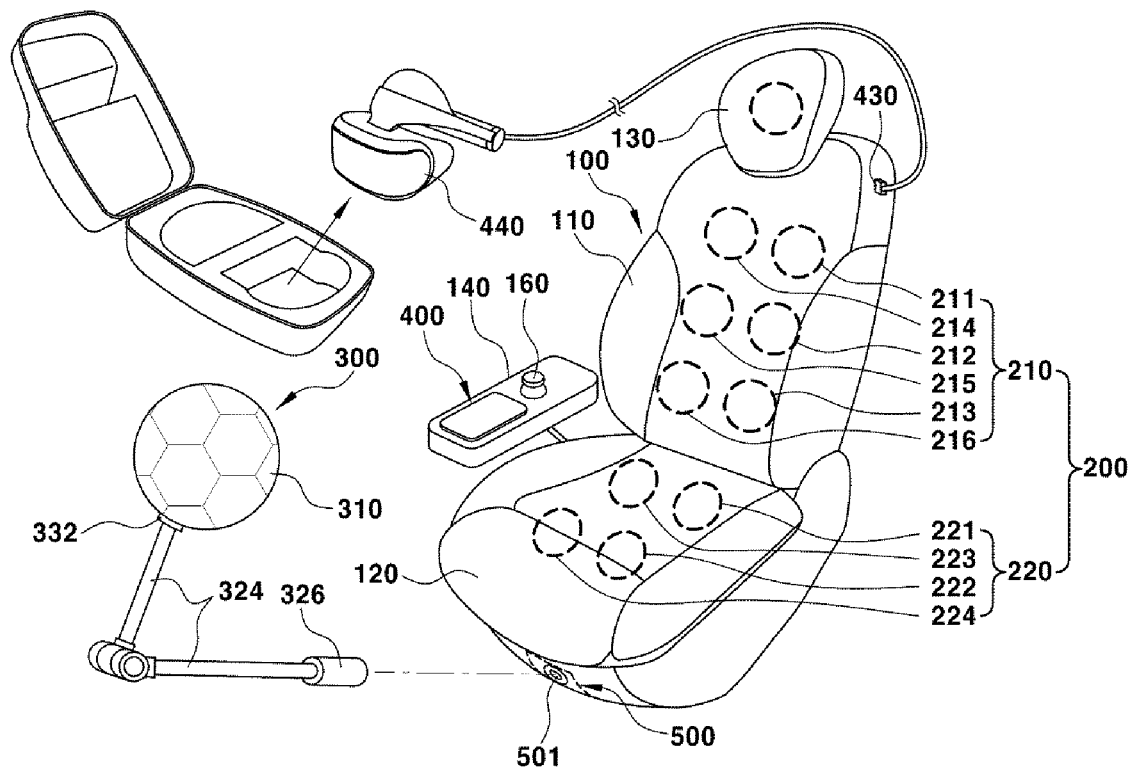
FIG. 1 is a view illustrating a configuration of a gaming device using a seat and a ball in an autonomous vehicle according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below.

FIG. 1 is a view illustrating a configuration of an entertainment device, for example, a gaming device, for an autonomous vehicle according to the present disclosure. In FIG. 1, reference numeral "100" designates a seat in an autonomous vehicle.

The seat 100 includes a seatback 110 for supporting an upper body of a passenger, a seat cushion 120 for supporting a lower body of the passenger, and a headrest 130 for supporting a head of the passenger.

A body pressure sensor 200 is mounted at laterally symmetrical positions of the seatback 110 and the seat cushion 120. The body pressure sensor 200 is adapted to sense a body pressure distribution of the upper body of the passenger and a body pressure distribution of the lower body of the passenger, thereby generating an input signal to be used for execution of a game using a ball.

As illustrated in FIG. 1, the body pressure sensor 200 includes a first body pressure sensor 210 internally mounted in the seatback 110 at the laterally symmetrical position of the seatback 110, to sense an upper body pressure distribution of the passenger, and a second body pressure sensor 220 internally mounted in the seat cushion 120 at the laterally symmetrical position of the seat cushion 120, to sense a lower body pressure distribution of the passenger.

The first body pressure sensor 210 may be adapted to sense a body pressure distribution variation exhibited when the upper body of the passenger comes into close contact with the seatback 110. The first body pressure sensor 210 includes a 1-1-th left body pressure sensor 211 for sensing a body pressure of the left upper back portion of the passenger, a 1-2-th left body pressure sensor 212 for sensing a body pressure of the left middle back portion of the passenger, a 1-3-th left body pressure sensor 213 for sensing a body pressure of the left waist portion of the passenger, a 1-1-th right body pressure sensor 214 for sensing a body pressure of the right upper back portion of the passenger, a 1-2-th right body pressure sensor 215 for sensing a body pressure of the right middle back portion of the passenger, and a 1-3-th right body pressure sensor 216 for sensing a body pressure of the right waist portion of the passenger.

In this case, the 1-1-th left body pressure sensor 211, the 1-2-th left body pressure sensor 212 and the 1-3-th left body pressure sensor 213 are internally mounted in a left portion of the seat back 110 while being uniformly spaced apart from one another in a vertical direction. On the other hand, the 1-1-th right body pressure sensor 214, the 1-2-th right body pressure sensor 215 and the 1-3-th right body pressure sensor 216 are internally mounted in a right portion of the seat back 110 while being uniformly spaced apart from one another in the vertical direction.

The second body pressure sensor 220 may include a 2-1-th left body pressure sensor 221 for sensing a body pressure of the left hip portion of the passenger, a 2-2-th left body pressure sensor 222 for sensing a body pressure of the left thigh portion of the passenger, a 2-1-th right body pressure sensor 223 for sensing a body pressure of the right hip portion of the passenger, and a 2-2-th right body pressure sensor 224 for sensing a body pressure of the right thigh portion of the passenger.

In this case, the 2-1-th left body pressure sensor 221 and the 2-2-th left body pressure sensor 222 are internally mounted in a left portion of the seat cushion 120 while being uniformly spaced apart from one another in forward and rearward directions. On the other hand, the 2-1-th right body pressure sensor 223 and the 2-2-th right body pressure sensor 224 are internally mounted in a right portion of the seat cushion 120 while being uniformly spaced apart from one another in the forward and rearward directions.

As such, the first and second body pressure sensors 210 and 220 sense upper and lower body pressure distributions of the passenger, respectively, in such a manner that body pressures of the sensed body pressure distributions are sorted into corresponding ones of high, middle and low levels, and then send sensed results to a game operation calculator 530 of a controller 500.

Figure 2:
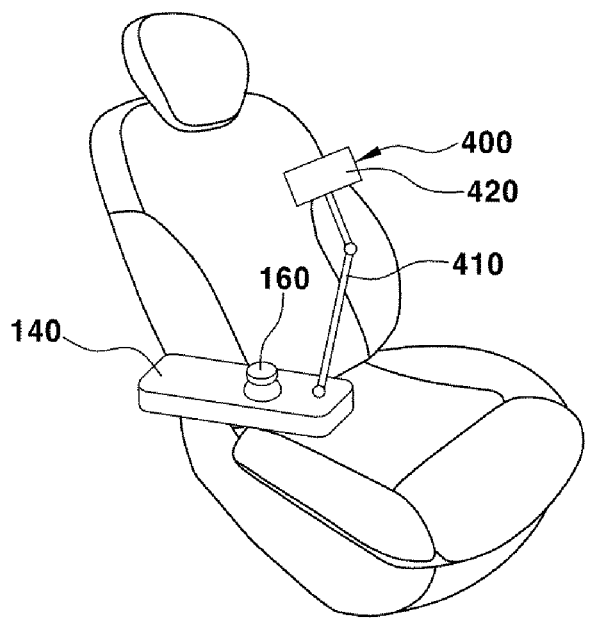
FIG. 2 is a schematic view illustrating a mounting example of a display and a joystick included in the configuration of the gaming device using a seat and a ball in an autonomous vehicle according to the present disclosure.

Referring to FIGS. 1 and 2, a display device 400 for displaying a game execution screen when a game using a ball is executed, and a joystick 160 for manipulation of the ball in the game are mounted at positions around the seat.

The display device 400 may include a multi-joint linkage 410 connected to an armrest mounted to one side portion of the seat such that the multi-joint linkage 410 is changeable in direction, and a display 420 rotatably mounted to a free end of the multi-joint linkage 410 by means of a hinge joint.

Accordingly, the passenger may easily set a position of the display 420 upon playing a game by changing the direction of the multi-joint linkage 410 toward the front of the passenger, and then rotating the display 420 toward the field of view of the passenger.

In this case, the joystick 160 is mounted on the armrest 140 mounted to one side portion of the seat such that the joystick 160 may be manipulated by the passenger.

Alternatively, as illustrated in FIG. 1, the display device 400 may be connected to a connector 430 exclusive for virtual reality (VR) provided at a predetermined position on the seatback 110 and, as such, may be used as a VR appliance 440 for displaying a game screen in accordance with a command from the controller 500.

In addition, as the display device 400, a selected one of an audio, video and navigation (AVN) display mounted in the vehicle, a head-up display to provide travel information, and a display to display a game screen on a window glass may be used.

Accordingly, when the passenger turns on the display 420 or the VR appliance 440, and then selects a football game, the controller 500 outputs an execution screen of the football game selected by the passenger to the display 420 or the VR appliance 440, and controls the overall execution of the football game selected by the passenger, based on sensing signals from the body pressure sensor 200 including the first and second body pressure sensors 210 and 220 and sensing signals from force sensors 320.

In accordance with the present disclosure, a game module 300 enabling the passenger to play a ball-used game is separately mounted to the seat.

Figure 3:
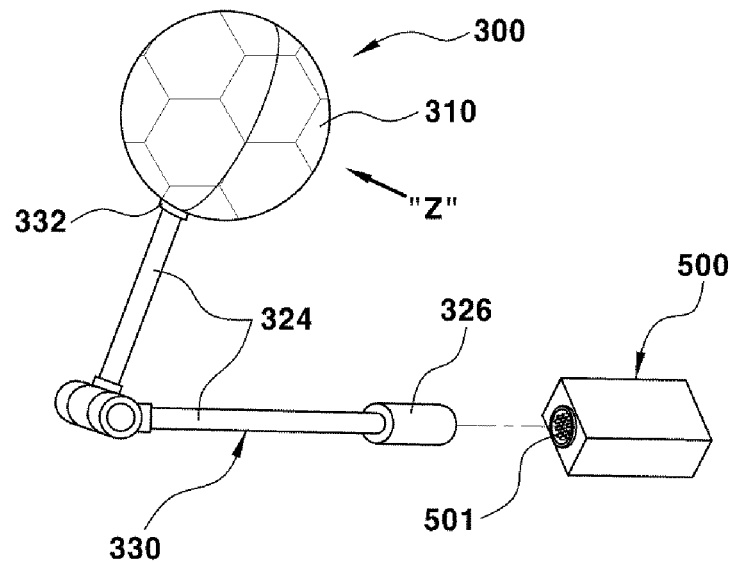
FIG. 3 is a schematic view illustrating a game module using a ball in the gaming device using a seat and a ball in an autonomous vehicle according to the present disclosure.

As illustrated in FIG. 3, the game module 300 includes a ball 310 enabling the passenger to kick the ball 310 by the foot, a plurality of force sensors 320 mounted in the ball 310, and a connector 330 for holding the ball 310 and outputting signals from the force sensors 320 to the controller 500.

Figure 4:
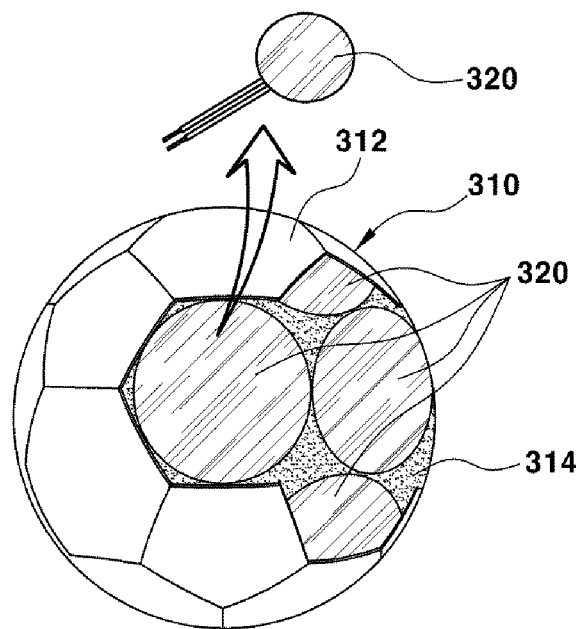
FIG. 4 is a schematic view illustrating a cross-sectional structure of the ball included in the game module of the gaming device using a seat and a ball in an autonomous vehicle according to the present disclosure.

In particular, the force sensors 320 of the game module 300 are sensors for sensing force generated when the passenger touches or kicks the ball 310 by the foot. As illustrated in FIG. 4, the force sensors 320 are attached between inner and outer layers 314 and 312 of the ball 310.

Nine or more force sensors 320 may be attached to one hemispherical surface of the ball 310 directed toward the passenger seated on the seat while being uniformly spaced apart from one another in vertical and horizontal directions.

Figure 5:
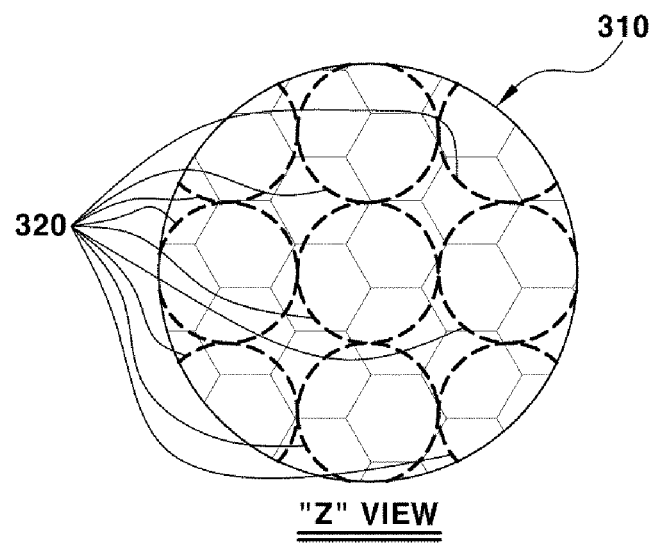
FIG. 5 is a schematic view illustrating arrangement of force sensors included in the game module of the gaming device using a seat and a ball in an autonomous vehicle according to the present disclosure when viewed at the front side.

As such, as illustrated in FIG. 5, the force sensors 320 are uniformly arranged in the vertical and horizontal directions over one hemispherical surface of the ball 310 which the passenger seated on the seat kicks or touches by the foot in a direction in which the passenger views the ball 310, that is, a direction Z in FIG. 5.

As illustrated in FIGS. 1 and 3, the connector 330 of the game module 300 includes an input connector 322 mounted to the other hemispherical surface of the ball 310, and connected to the force sensors 320 such that the input connector 322 may exchange signals with the force sensors 320, an output connector 326 connected to the controller 500 such that the output connector 326 may exchange signals with the controller 500, and a signal transfer connector 324 for connecting the input connector 322 and the output connector 326 while having a multi-joint linkage structure with two or more links.

In this case, the controller 500 is mounted to the seat cushion 120 at a predetermined position of a lower portion of the seat cushion 120.

Figure 6:
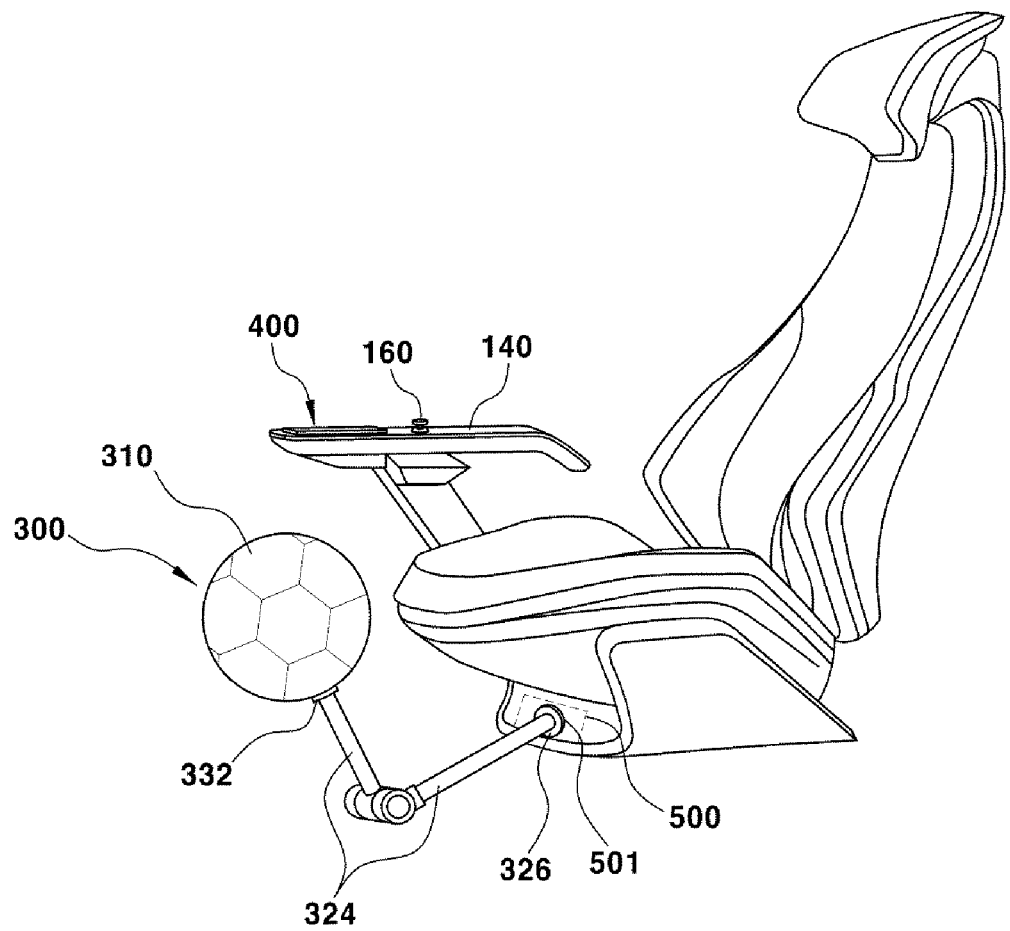
FIG. 6 is a schematic view illustrating a state in which the game module using a ball in the gaming device using a seat and a ball in an autonomous vehicle according to the present disclosure is mounted in the seat.

Accordingly, when the output connector 326 of the game module 300 is connected to an input port 501 of the controller 500 mounted at the predetermined position of the lower portion of the seat cushion 120, a state in which the passenger can touch or kick the ball 310 by the foot and a state in which sensing signals from the force sensors 320 can be sent to the controller 500 are obtained, as illustrated in FIG. 6.

A pump module 340 for supplying air to the ball 310 or deflating the ball 310 may be mounted to the seat cushion 120 at a predetermined position of the lower portion of the seat cushion 120.

Figure 7:
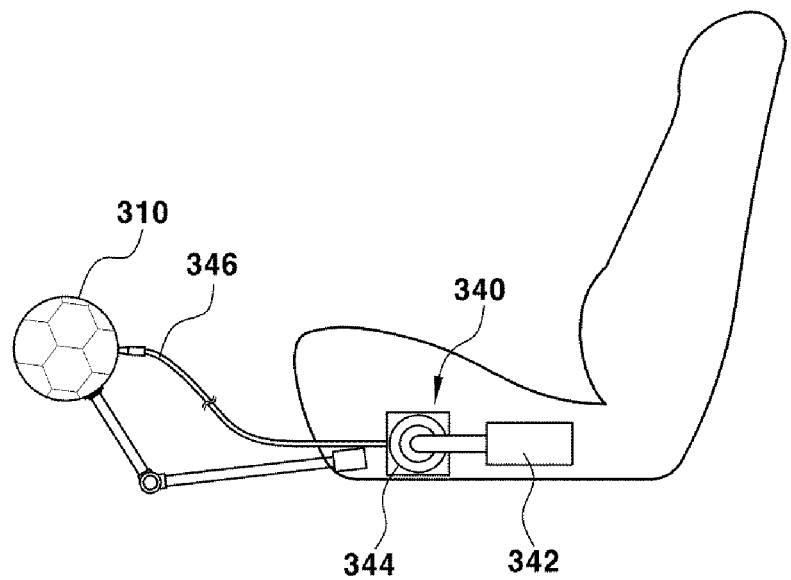
FIG. 7 is a schematic view illustrating an example in which a pump for air injection into a ball and deflation of the ball included in the gaming device using a seat and a ball in an autonomous vehicle according to the present disclosure is mounted in the seat.

As illustrated in FIG. 7, the pump module 340 may include an air pump 342, and a nozzle line 346 connected to an outlet of the air pump 342 while being wound around a drum 344.

Accordingly, it may be possible to supply air to the ball 310 through a blowing operation of the air pump 342 after pulling the nozzle line 346 from the drum 344 and then connecting the nozzle line 346 to the ball 310. Upon non-use of the ball 310, it may be possible to outwardly discharge air supplied to the ball 310 through a suction operation of the air pump 342.

Figure 8:
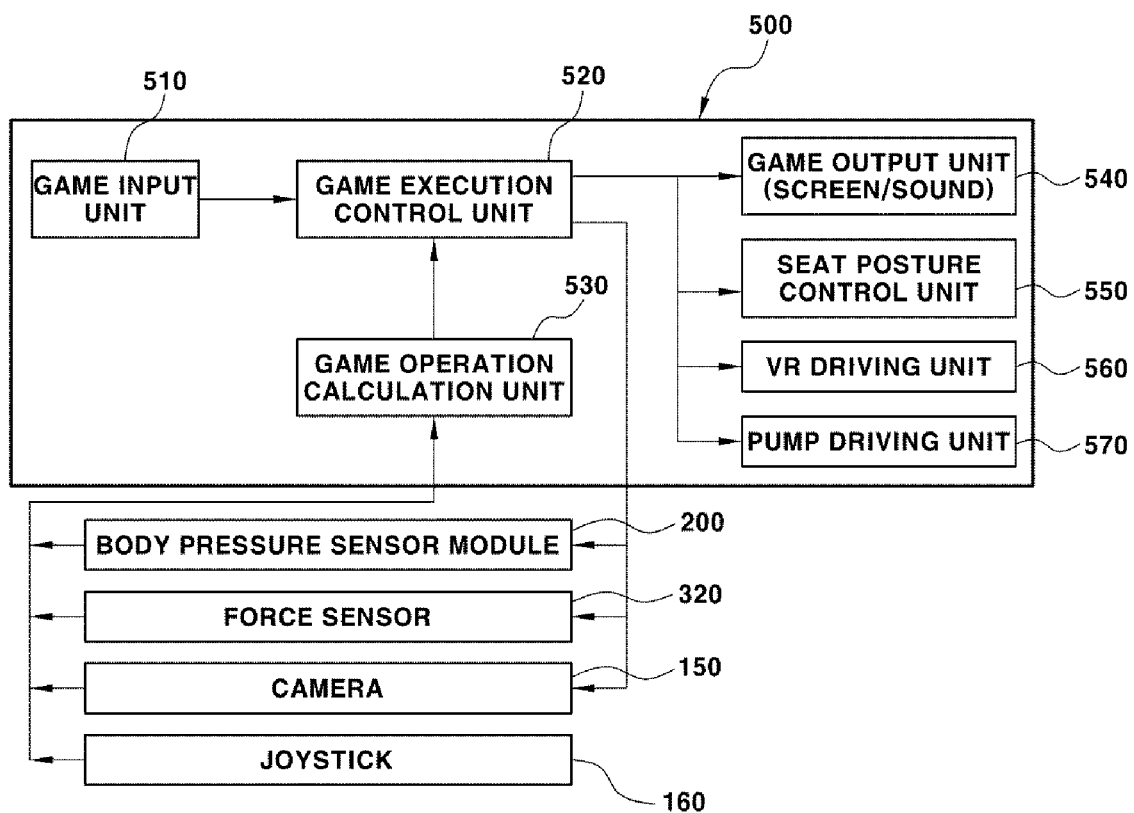
FIG. 8 is a block diagram illustrating a control configuration of the gaming device using a seat and a ball in an autonomous vehicle according to the present disclosure.
Figure 9:
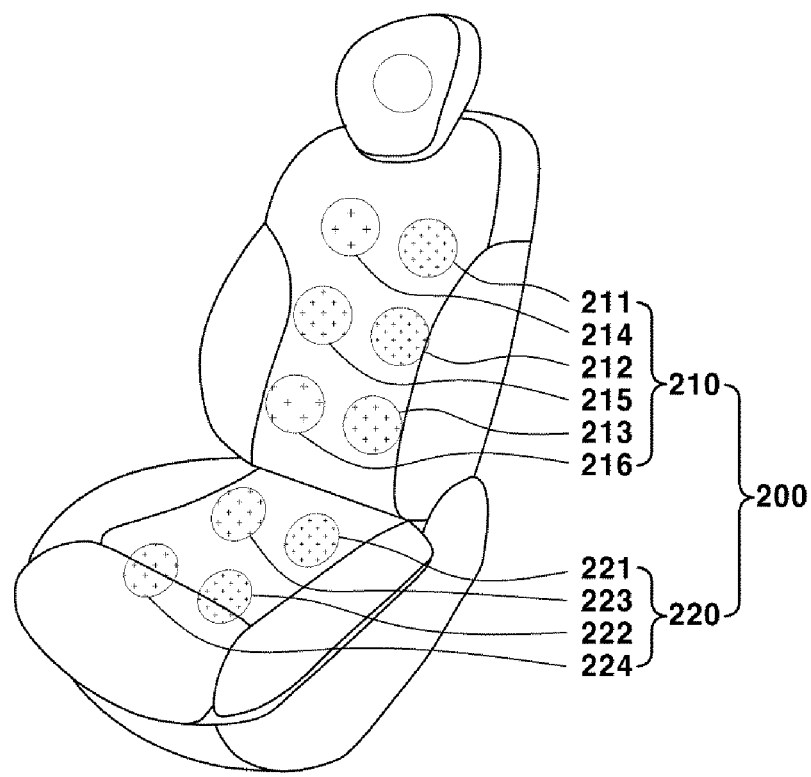
FIG. 9 is a schematic view illustrating a body pressure sensing example of body pressure sensors included in the gaming device using a seat and a ball in an autonomous vehicle according to the present disclosure.

As illustrated in FIG. 8, the controller 500 includes a game input device 510 for inputting information as to whether or not the game is executed and information as to a selected game mode (for example, a penalty kick mode, a free kick mode, a match mode, or the like in a football game) in accordance with manipulation of the user. The controller 500 also includes a game execution controller 520 for executing the game mode selectively input through the game input device 510, and applying an activation signal to the force sensors 320 of the body pressure sensor 200 and the game module 300, a game operation calculator 530 for receiving sensing signals from the body pressure sensor 200 and the force sensors 320, calculating the current game execution motion of the passenger, based on the received sensing signals, and inputting calculated results to the game execution controller 520, and a game output device 540 for outputting a game execution screen and a sound in accordance with a command from the game execution controller 520.

The controller 500 further includes a seat posture controller 550 for outputting an adjustment signal for adjustment of a seat posture to meet the game mode input through the game input device 510, a VR driving device 560 for driving VR upon connection to the VR connector 430, and a pump driving device 570 for supplying a driving command to the air pump 342 functioning to supply air to the ball 310 of the game module 300 or to deflate the ball 310.

In the present disclosure, the controller 500 may be a computer, a processor, a central processing unit, an electronic control unit, or the like.

Figure 19:
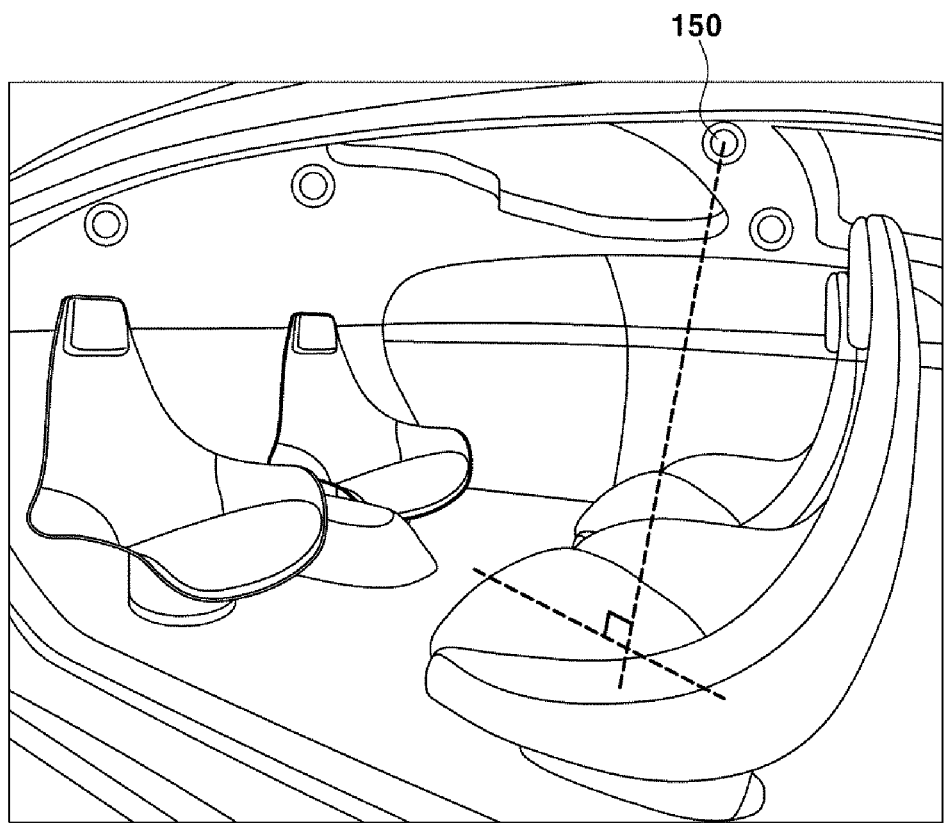
FIG. 19 is a schematic view illustrating an installation example of a camera included in the configuration of the gaming device of the autonomous vehicle according to the present disclosure.

In addition, the gaming device further includes a camera 150 for sensing motion of the passenger to determine various dribble postures upon playing a football game, and sending sensed results to the controller 500. As illustrated in FIG. 19, the camera 150 may be mounted to a ceiling surface disposed over each seat of the autonomous vehicle.

Hereinafter, operation flow of the gaming device configured as described above to operate using the seat and the ball in the autonomous vehicle will be described.

Figure 10:
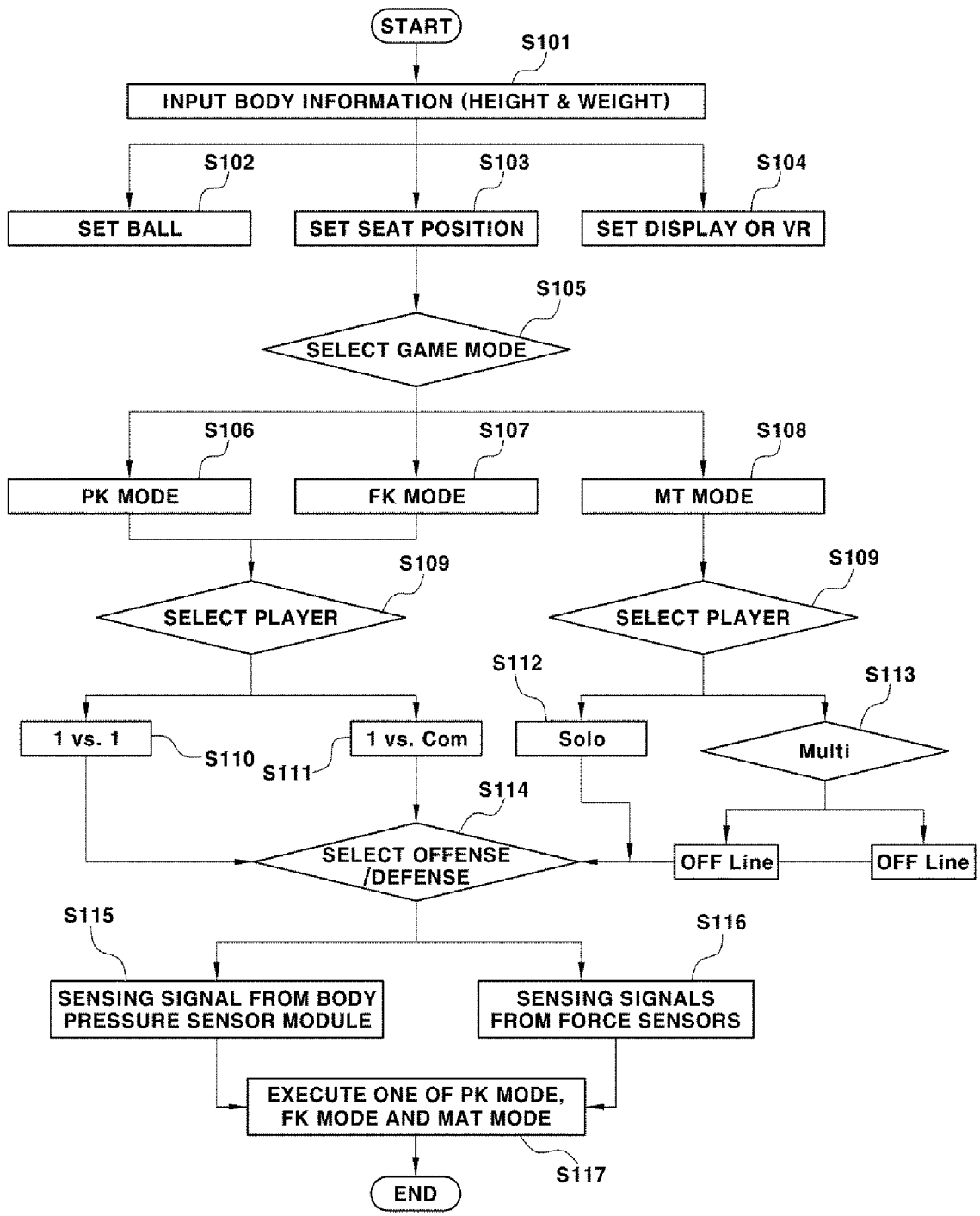
FIG. 10 is a flowchart illustrating a gaming method in an autonomous vehicle according to the present disclosure.

FIG. 10 is a flowchart illustrating a method for executing a game in an autonomous vehicle in accordance with the present disclosure.

First, the passenger turns on the display 420, and inputs information as to the body of the passenger (height and weight) (S101).

The input body information is subsequently sent to the controller 500 which, in turns, sets the ball 310 of the game module 300, a seat position and the display device 400 in accordance with the body information.

For example, the setting procedure executed by the controller 500 includes a ball setting procedure S102 of sending a driving command from the pump driving device 570 of the controller 500 to the air pump 343, thereby supplying air to the ball 310, a seat position setting procedure S103 of sending a driving command from the seat posture controller 550 to a motor for adjusting reclining and forward/rearward movement of the seat, thereby adjusting a seat posture such that the foot of the passenger may be positioned to be approximate to the ball 310, and a procedure S104 of setting a position of the multi-joint linkage 410 connected to the display 420 such that the passenger may view the display 420.

Thereafter, the passenger selects a desired game mode from a menu displayed on the display 420 or the VR appliance 440 through the game input device 510, thereby inputting the selected game mode through the game input device 510 (S105).

In this case, the passenger may select a penalty kick mode from football game modes displayed through the game input device 510 (S106), may select a free kick mode from the displayed football game modes (S107), or may select a match mode from the displayed football game modes (S108).

In addition, the passenger selects a player from the menu displayed through the game input device 510 (S109).

For example, the passenger may select a 1:1 mode (S110), a computer counterpart mode (S111), a solo-mode (S112), or a multi-mode (S113).

In addition, the passenger selects offense or defense from the menu through the game input device 510 (S114).

Thereafter, the game execution controller 520 of the controller 500 executes the game mode selected by the passenger, and, at the same time, applies an activation signal to the body pressure sensor 200 mounted to the seat and the force sensors 320 mounted in the ball 310.

Accordingly, the game operation calculator 530 of the controller 500 receives a sensing signal from the body pressure sensor 200 (S115) while receiving sensing signals from the force sensors 320 (S116), thereby calculating the current game execution motion of the passenger. Based on calculated results, the game execution controller 520 executes a football game (one of the penalty kick mode, the free kick mode and the match mode) (S117).

In accordance with commands from the game execution controller 520, a game execution screen and a sound are output through the game output device 540 and, as such, the passenger may play the football game (one of the penalty kick mode, the free kick mode and the match mode).

Hereinafter, execution examples of the penalty kick mode, the free kick mode and the match mode will be described.

Penalty Kick (PK) Mode

Figure 11:
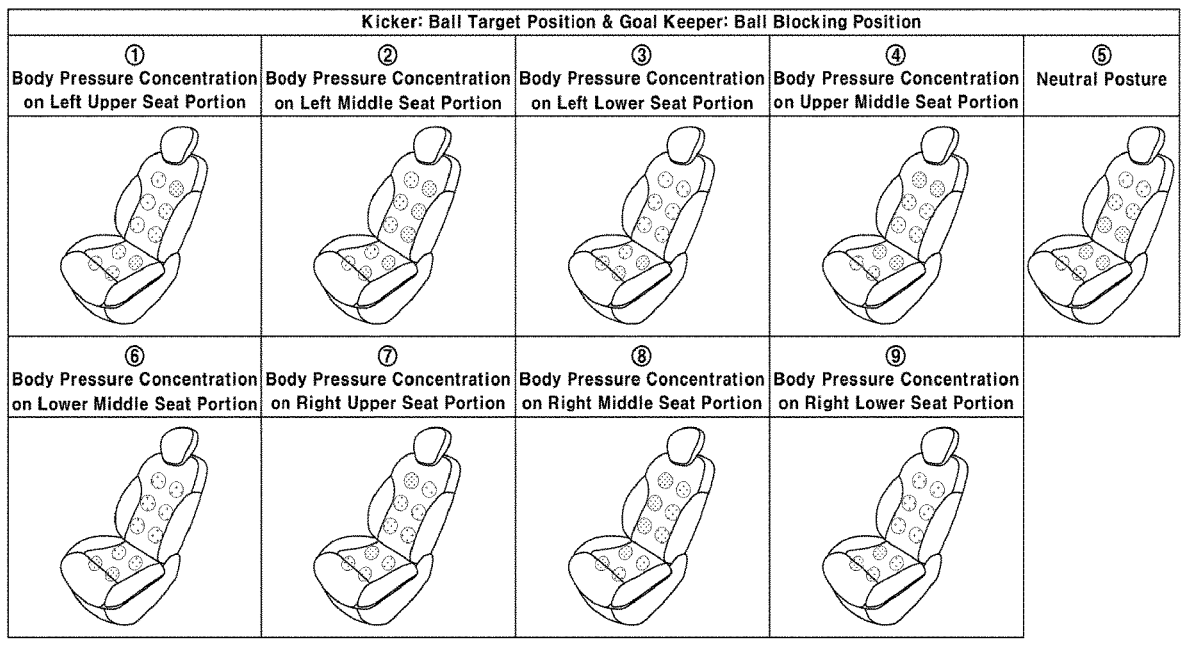
FIGS. 11 and 12 are diagrams illustrating an example in which the passenger plays a football game in a penalty kick mode using the gaming device of the autonomous vehicle according to the present disclosure.
Figure 12:
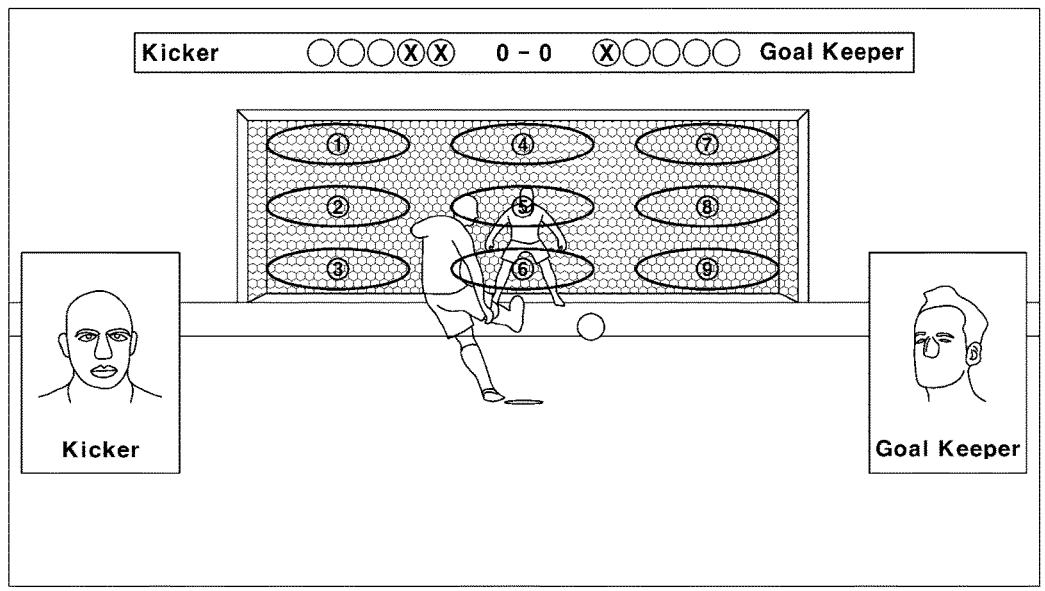

FIGS. 11 and 12 are diagrams illustrating an example in which the passenger plays a football game in a penalty kick mode using the gaming device of the autonomous vehicle according to the present disclosure.

In the penalty kick mode, the game operation calculator 530 determines a ball target position where a ball shot by a kicker reaches and a ball blocking position where a goal keeper blocks a shot ball from a plurality of divisional goal post areas (indicated by thick ovals in FIG. 12), based on a body pressure signal from the body pressure sensor 200. The game operation calculator 530 also determines a ball advance direction based on sensing signals generated from the force sensors 320 when the passenger kicks the ball 310.

For example, when the game operation calculator 530 determines that the body pressure signal of the body pressure sensor 200 (the passenger body pressure signal at the side of a kicker) represents a body pressure concentration on a left upper seat portion for a predetermined time or more, as illustrated in ① of FIG. 11, the game operation calculator 530 may decide that the kicker shoots a ball toward a goal post area ① of FIG. 12 among the plural divisional goal post areas as illustrated in FIG. 12.

On the other hand, upon determining that the body pressure signal of the body pressure sensor 200 (the passenger body pressure signal at the side of a goal keeper) represents a body pressure concentration on the left upper seat portion for a predetermined time or more, as illustrated in ① of FIG. 11, the game operation calculator 530 may decide that the goal keeper blocks a ball shot toward the goal post area ① of FIG. 12 among the plural divisional goal post areas as illustrated in FIG. 12.

Accordingly, the game execution controller 520 receives a decision signal from the game operation calculator 530, and then outputs a game execution screen and a sound through the game output device 540, and, as such, the penalty kick mode is executed in such a manner that the kick of the kicker is decided as a missed kick when the position represented by the passenger body pressure signal at the side of the kicker is identical to the position represented by the passenger body pressure signal at the side of the goal keeper, whereas the kick of the kicker is decided as a goal when the above-described positions differ from each other.

Free Kick (FK) Mode

Figures 14, 15:
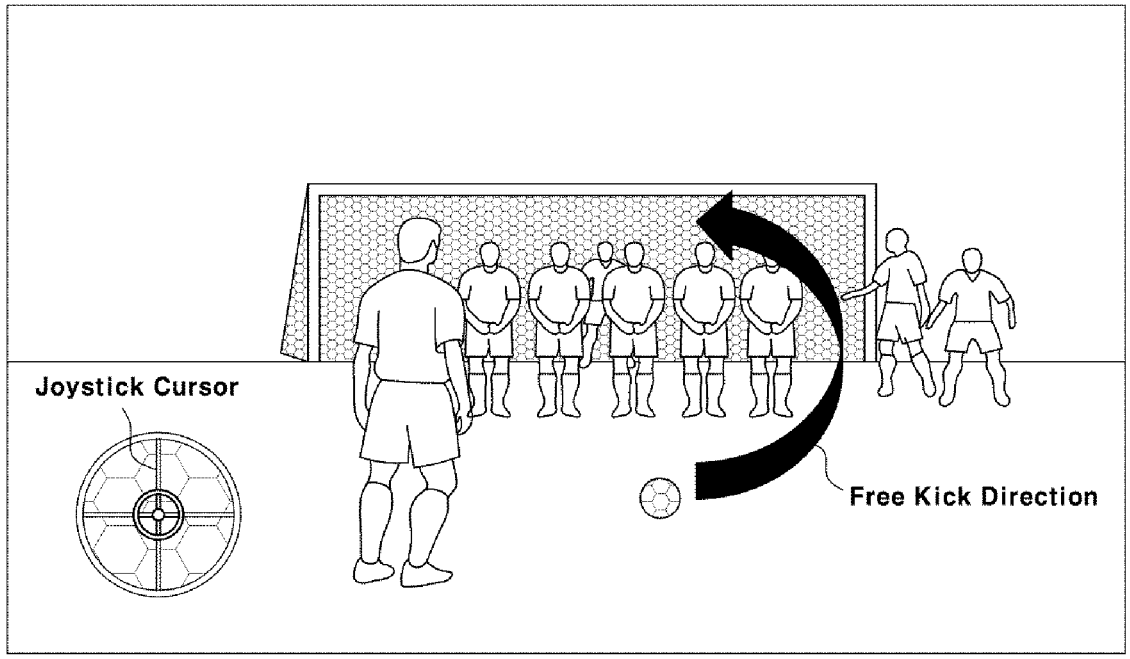

FIGS. 13 and 14 are diagrams illustrating an example in which the passenger plays a football game in a free kick mode using the gaming device of the autonomous vehicle according to the present disclosure.

In the free kick mode, the game operation calculator 530 determines an advance quality and an advance height of the ball, based on sensing signals of the force sensors 320 varying in accordance with a kicking position of the passenger on the ball 310.

For example, when the passenger kicks a left upper end portion of the ball 310, as illustrated in FIG. 13, the advance quality of the ball corresponds to an out-front kick, and the advance height of the ball corresponds to a driven kick by which the ball advances at a low advance height.

In addition, in the free kick mode, the game operation calculator 530 determines an advance curve of the ball generated during advance of the ball, based on the body pressure signal from the body pressure sensor 200, and determines an intensity of a free kick based on sensing signals from the force sensors 320 varying in accordance with a kicking intensity of the passenger kicking the ball 310.

For example, as illustrated in FIG. 13, when the body pressure of the passenger is concentrated on a left seat portion, and is adjusted to be increased or decreased, the degree of a left advance curve of the ball may be determined. On the other hand, when the body pressure of the passenger is concentrated on a right seat portion, and is adjusted to be increased or decreased, the degree of a right advance curve of the ball may be determined.

In addition, in the free kick mode, the game operation calculator 530 determines a free kick direction in accordance with a manipulation signal from the joystick 160.

For example, as illustrated in FIG. 14, the free kick direction may be determined based on movement of a cursor according to manipulation of the joystick 160.

Accordingly, the game execution controller 520 receives a decision signal from the game operation calculator 530, and then outputs a game execution screen and a sound through the game output device 540, and, as such, the free kick mode is executed.

Match (MT) Mode

FIGS. 15 to 18 are diagrams illustrating an example in which the passenger plays a football game in a match mode using the gaming device of the autonomous vehicle according to the present disclosure.

When the passenger selects the match mode from among game modes displayed through the game input device 510, the game execution controller 520 executes the match mode and, as such, a screen like an actual football game is displayed as the game execution screen output to the display through the game output device 540, as illustrated in FIG. 18.

In the match mode, the game operation calculator 530 determines a left/right dribble direction of the ball in accordance with a manipulation signal from the joystick 160. The game operation calculator 530 also determines an advancing dribble direction of the ball based on sensing signals of the force sensors 320 generated when the passenger repeatedly touches the ball 310 at a predetermined intensity or less.

For example, as illustrated in FIG. 15, when the game operation calculator 530 receives sensing signals from the force sensors 320 generated when the passenger repeatedly touches the ball 310 at a predetermined intensity (5 kgf) or less, the game operation calculator 530 decides advancing dribble. When the game operation calculator 530 also receives a left manipulation signal from the joystick 160, the game operation calculator 530 decides left dribble. On the other hand, upon receiving a right manipulation signal from the joystick 160, the game operation calculator 530 decides right dribble. The game operation calculator 530 then sends decided results to the game execution controller 520.

In the match mode, the game operation calculator 530 determines an advance quality and an advance height of the ball based on sensing signals from the force sensors 320 varying in accordance with a kicking position of the passenger on the ball 310. The game operation calculator 530 also determines pass and shooting intensities based on sensing signals from the force sensors 320 varying in accordance with a kicking intensity of the passenger.

For example, as illustrated in FIG. 16, in the match mode, when the passenger kicks a left upper end portion of the ball 31, the game operation calculator 530 decides that the advance quality of the ball corresponds to an out-front kick, and the advance height of the ball corresponds to a driven kick by which the ball advances at a low advance height. The game operation calculator 530 also decides that pass and shooting intensities have been adjusted to be weak, normal or strong, based on the ball kicking intensity.

In addition, in the match mode, the game operation calculator 530 determines a ball dribble posture based on a body pressure signal from the body pressure sensor 200 and an image signal from the camera 150.

For example, as illustrated in FIG. 17, when the game operation calculator 530 receives a body pressure signal from a body pressure sensor internally mounted in the headrest 130 or an image signal generated from the camera 150 upon photographing motion of the passenger to move the head in a desired direction, the game operation calculator 530 decides a posture that the kicker dribbles the ball by the head.

In addition, as illustrated in FIG. 17, it may be possible to decide dribble postures such as physical play, tackle and throwing based on the body pressure signal from the body pressure sensor 200 and the image signal from the camera 150.

Accordingly, the game execution controller 520 receives decision signals from the game operation calculator 530, and then outputs a game execution screen and a sound through the game output device 540, and, as such, the match mode is executed.

As apparent from the above description, in accordance with the present disclosure, it may be possible to provide a motion effect enabling the passenger to move the body while providing an amusement effect to the passenger while eliminating tediousness in a situation such as long-distance travel of an autonomous vehicle, which will be commercially available in future, by enabling the passenger to play a football game (in a penalty kick mode, a free kick mode, a match mode, or the like) in a state of being seated on a seat, based on a body pressure signal from a body pressure sensor generated when the upper and lower body portions, etc. of the passenger move and sensing signals generated from body pressure sensors when the passenger touches or kicks a ball.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A device for playing a game using a seat and a ball in an autonomous vehicle, the device comprising:
   a body pressure sensor internally disposed in a seatback and a seat cushion at laterally symmetrical positions of the seatback and the seat cushion, the body pressure configured to sense a body pressure distribution of an upper body of a passenger and a body pressure distribution of a lower body of the passenger;
   a display device disposed at a position around the seat, the display configured to display a game execution screen when the game using the ball is executed;
   a joystick disposed at a position around the seat, the joystick configured to manipulate the ball in the game; and
   a game device connected to a front portion of the seat cushion, the game device comprising:
      the ball enabling the passenger to kick the ball by a foot;
      a plurality of force sensors mounted on the ball; and
      a connector for holding the ball and outputting signals from the force sensors to a controller,
      wherein the controller is configured to output the game execution screen to the display device, and to control overall execution of the game based on a sensing signal from the body pressure sensor and sensing signals from the force sensors.

2. The device according to claim 1, wherein the body pressure sensor comprises:
   a first body pressure sensor internally disposed in the seatback at the laterally symmetrical position of the seatback, the first body pressure sensor configured to sense an upper body pressure of the passenger; and
   a second body pressure sensor internally mounted in the seat cushion at the laterally symmetrical position of the seat cushion, the second body pressure sensor configured to sense a lower body pressure of the passenger.

3. The device according to claim 2, wherein the first body pressure sensor comprises:
   a 1-1-th left body pressure sensor for sensing a body pressure of a left upper back portion of the passenger;
   a 1-2-th left body pressure sensor for sensing a body pressure of a left middle back portion of the passenger;
   a 1-3-th left body pressure sensor for sensing a body pressure of a left waist portion of the passenger;
   a 1-1-th right body pressure sensor for sensing a body pressure of a right upper back portion of the passenger;
   a 1-2-th right body pressure sensor for sensing a body pressure of a right middle back portion of the passenger; and
   a 1-3-th right body pressure sensor for sensing a body pressure of a right waist portion of the passenger.

4. The device according to claim 2, wherein the second body pressure sensor comprises:
   a 2-1-th left body pressure sensor for sensing a body pressure of a left hip portion of the passenger;
   a 2-2-th left body pressure sensor for sensing a body pressure of a left thigh portion of the passenger;
   a 2-1-th right body pressure sensor for sensing a body pressure of a right hip portion of the passenger; and
   a 2-2-th right body pressure sensor for sensing a body pressure of a right thigh portion of the passenger.

5. The device according to claim 1, wherein the display device comprises:
   a multi-joint linkage connected to an armrest mounted to one side portion of the seat such that the multi-joint linkage is changeable in direction; and
   a display rotatably mounted to a free end of the multi-joint linkage.

6. The device according to claim 1, wherein the joystick is mounted on an armrest mounted to one side portion of the seat such that the joystick can be manipulated by the passenger.

7. The device according to claim 1, wherein the display device is connected to a connector exclusive for virtual reality (VR) provided at a predetermined position on the seatback such that the display device is used as a VR appliance for displaying a game screen in accordance with a command from the controller.

8. The device according to claim 1, wherein the force sensors of the game device comprises 9 or more force sensors attached to one hemispherical surface of the ball between outer and lower layers of the ball while being uniformly spaced apart from one another in vertical and horizontal directions.

9. The device according to claim 1, wherein the connector of the game device comprises:
   an input connector mounted to another hemispherical surface of the ball, and connected to the force sensors such that the input connector can exchange signals with the force sensors;
   an output connector connected to the controller such that the output connector can exchange signals with the controller; and
   a signal transfer connector for connecting the input connector and the output connector while having a multi-joint linkage structure with two or more links.

10. The device according to claim 1, wherein the controller comprises:
    a game input device for inputting information as to whether or not the game is executed and information as to selection of a game mode;
    a game execution controller configured to execute the selection of the game mode through the game input device, and to apply an activation signal to the force sensors of the body pressure sensor and the game device;
    a game operation calculator configured to receive sensing signals from the body pressure sensor and the force sensors, to calculate a current game execution motion of the passenger based on the received sensing signals, and to input calculated results to the game execution controller; and
    a game output device for outputting a game execution screen and a sound in accordance with a command from the game execution controller.

11. The device according to claim 10, wherein the game mode selectable through the game input device is a selected one of a penalty kick mode, a free kick mode and a match mode in a football game, or is a selected one of a foot volleyball mode, a food baseball mode and a sepak takraw mode in a kicking game using feet.

12. The device according to claim 10, wherein, in a penalty kick mode, the game operation calculator determines a position where a ball shot by a kicker reaches and a position where a goal keeper blocks a shot ball from a plurality of divisional goal post areas, based on a body pressure signal from the body pressure sensor, and determines a ball advance direction based on sensing signals generated from the force sensors when the passenger kicks the ball.

13. The device according to claim 10, wherein, in a free kick mode, the game operation calculator determines a free kick direction in accordance with a manipulation signal from the joystick, determines an advance quality based on sensing signals of the force sensors varying in accordance with a kicking position of the passenger on the ball, determines an intensity of a free kick based on sensing signals from the force sensors varying in accordance with a kicking intensity of the passenger kicking the ball, and determines an advance curve of the ball generated during advance of the ball, based on a body pressure signal from the body pressure sensor.

14. The device according to claim 10, wherein, in a match mode, the game operation calculator determines a left/right dribble direction of the ball in accordance with a manipulation signal from the joystick, determines an advancing dribble direction of the ball based on sensing signals from the force sensors generated when the passenger repeatedly touches the ball at a predetermined intensity or less, determines an advance quality of the ball based on sensing signals from the force sensors varying in accordance with a kicking position of the passenger on the ball, determines pass and shooting intensities based on sensing signals from the force sensors varying in accordance with a kicking intensity of the passenger, and determines a ball dribble posture based on a body pressure signal from the body pressure sensor.

15. The device according to claim 10, wherein the controller comprises:

a seat posture controller for outputting an adjustment signal for adjustment of a seat posture to meet a game mode input through the game input device;
a virtual reality (VR) driving device for driving VR upon connection to a VR connector; and
a pump driving device for supplying a driving command to a pump adapted to supply air to the ball of the game device or to deflate the ball.

16. The device according to claim 1, further comprising a camera for sensing motion of the passenger to determine various dribble postures upon playing a football game, the camera sending sensed results to the controller.

* * * * *